United States Patent
Yang (10) Patent No.: US 9,420,461 B2
(45) Date of Patent: Aug. 16, 2016

(54) ACCESS AUTHENTICATION METHOD AND DEVICE FOR WIRELESS LOCAL AREA NETWORK HOTSPOT

(75) Inventor: Hui Yang, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 0 days.

(21) Appl. No.: 14/378,075

(22) PCT Filed: Apr. 11, 2012

(86) PCT No.: PCT/CN2012/073831
§ 371 (c)(1),
(2), (4) Date: Aug. 11, 2014

(87) PCT Pub. No.: WO2013/117041
PCT Pub. Date: Aug. 15, 2013

(65) Prior Publication Data
US 2015/0026774 A1 Jan. 22, 2015

(30) Foreign Application Priority Data
Feb. 10, 2012 (CN) .......................... 2012 1 0030081

(51) Int. Cl.
*H04W 12/06* (2009.01)
*H04L 29/06* (2006.01)
(Continued)

(52) U.S. Cl.
CPC .............. *H04W 12/06* (2013.01); *H04L 63/083* (2013.01); *H04L 63/0846* (2013.01); *H04W 12/04* (2013.01); *H04W 84/02* (2013.01)

(58) Field of Classification Search
CPC . H04L 63/0846; H04L 63/083; H04W 12/06; H04W 84/02; H04W 12/04
USPC .............. 726/1–7, 11–15; 380/255, 270; 455/410, 411; 370/252–255; 709/228, 709/237; 713/168
See application file for complete search history.

(56) References Cited

U.S. PATENT DOCUMENTS

| 8,244,258 B2 * | 8/2012 | Hori .............................. 455/445 |
| 2004/0001467 A1 * | 1/2004 | Cromer et al. ................ 370/338 |

(Continued)

FOREIGN PATENT DOCUMENTS

| CN | 1534931 A | 10/2004 |
| CN | 1682487 A | 10/2005 |

(Continued)

OTHER PUBLICATIONS

International Search Report for PCT International Application No. PCT/CN2012/073831, mailed Nov. 8, 2012.

(Continued)

*Primary Examiner* — Shanto M Abedin
(74) *Attorney, Agent, or Firm* — Pearl Cohen Zedek Latzer Baratz LLP (57) ABSTRACT

Disclosed are an access authentication method and device for a WLAN hotspot. The method comprises: an access password of a WLAN hotspot is updated according to a preset update time interval; and access for a wireless workstation which is accessing to the WLAN hotspot through a soft AP is authenticated according to the updated access password. The disclosure can solve the problem in the related art that other users can use traffic without limitation once they have stolen the password which causes great damage to users who pay the bill because the access password of the WLAN hotspot can only be manually updated.

4 Claims, 8 Drawing Sheets

(51) Int. Cl.
*H04W 12/04* (2009.01)
*H04W 84/02* (2009.01)

(56) References Cited

U.S. PATENT DOCUMENTS

| | | | |
|---|---|---|---|
| 2005/0107089 A1* | 5/2005 | Fukui | H04L 63/083 455/452.1 |
| 2005/0210288 A1* | 9/2005 | Grosse | H04L 63/0272 726/5 |
| 2005/0246531 A1* | 11/2005 | Fabre | H04L 63/067 713/168 |
| 2006/0007897 A1 | 1/2006 | Ishii | |
| 2006/0221917 A1* | 10/2006 | McRae | 370/338 |
| 2007/0174901 A1 | 7/2007 | Chang et al. | |
| 2007/0218874 A1* | 9/2007 | Sinha et al. | 455/411 |
| 2009/0225683 A1* | 9/2009 | Collins et al. | 370/255 |
| 2009/0288144 A1* | 11/2009 | Huber et al. | 726/3 |
| 2010/0263022 A1* | 10/2010 | Wynn | H04W 12/06 726/3 |
| 2012/0072976 A1* | 3/2012 | Patil | H04W 12/06 726/6 |
| 2013/0024921 A1* | 1/2013 | Gupta et al. | 726/6 |
| 2013/0094386 A1* | 4/2013 | Kawamura | 370/252 |
| 2013/0103807 A1* | 4/2013 | Couto et al. | 709/220 |
| 2013/0322401 A1* | 12/2013 | Visuri et al. | 370/331 |

FOREIGN PATENT DOCUMENTS

| | | |
|---|---|---|
| CN | 101005351 A | 7/2007 |
| CN | 102271187 A | 12/2011 |
| WO | WO 2004/015954 A1 | 2/2004 |

OTHER PUBLICATIONS

Extended European Search Report for European Patent Application No. EP12867828.1, mailed Nov. 6, 2014.

* cited by examiner

ACCESS AUTHENTICATION METHOD AND DEVICE FOR WIRELESS LOCAL AREA NETWORK HOTSPOT

CROSS-REFERENCE TO RELATED APPLICATIONS

This application is a National Phase Application of PCT International Application No. PCT/CN2012/073831, International Filing Date Apr. 11, 2012, claiming priority of Chinese Patent Application No. 201210030081.0, filed Feb. 10, 2012, which is hereby incorporated by reference.

TECHNICAL FIELD

The disclosure relates to the communication field, and in particular to an access authentication method and device for a wireless local area network (WLAN in short) hotspot.

BACKGROUND OF THE INVENTION

WLAN is a network established within a certain local range using wireless communication technologies, which is a product of combining computer networks and wireless communication technologies, and it takes a wireless multi-address channel as a transmission medium to provide the functions of the traditional wired local area network (LAN in short) and can enable a user to access a wideband network anytime and anywhere freely.

The core device in WLAN network is a wireless access point (AP in short), similar to a base station in a cellular structure, generally located in a basic service area (BSA in short), which is the center of a communication coverage area. It is mainly the bridge of a wireless workstation and a wired local area network, and with an AP, it is just like there is a Hub of a wired network, and the wireless workstation may rapidly and easily connect to the network.

A portable WLAN hotspot is a functional module of a wireless mobile terminal, which enables the wireless mobile terminal to be a compound body of the wireless workstation and the wireless access point (AP): the wireless mobile terminal either may be a workstation to access other APs via WLAN technology to obtain the right to access the network; or may be a wireless AP for being connected to other devices. When other devices are connected to an external network via a wireless mobile terminal which is used as a WLAN hotspot, a data access service may be performed, and at this moment, what is consumed is the subscription data traffic of the wireless mobile terminal. For example, a portable PC machine may connect to a wireless network of a mobile phone via a WLAN hotspot, but the traffic used y the portable PC is the subscription data traffic of the user of the mobile phone.

For a portable WLAN hotspot based on the existing implementation technology, once an access password is set, the password will not change unless it is modified manually; and once other users know the password of this premium user, they may perform a data service without limitation via an AP, thus consuming the data traffic of the premium user, however, the data traffic subscribed by each user is limited and should be paid, and if the WLAN hotspot is open always, this will cause great loss to the premium user, thus decreasing the experience of the user.

SUMMARY OF THE INVENTION

The disclosure provides an access authentication method and device for a WLAN hotspot, so as to solve the problem in the relevant art that other users can use traffic without limitation once they have obtained the password which causes great damage to users who pay the bill because the access password of the WLAN hotspot may only be manually updated.

According to one aspect of the disclosure, provided is an access authentication method for a WLAN hotspot, comprising: updating an access password of the WLAN hotspot according to a preset update time interval; and authenticating access for a wireless workstation which is connecting to the WLAN hotspot through a soft AP according to the updated access password.

Preferably, updating the access password of the WLAN hotspot according to the preset update time interval comprises: the WLAN hotspot updates the access password according to the preset update time interval and displays a prompt that the access password has been updated.

Preferably, the updated access password is generated according to a random generation algorithm.

Preferably, before updating the access password of the WLAN hotspot according to the preset update time interval, the method further comprises: activating an access password update function of the WLAN hotspot and setting the update time interval.

Preferably, after authenticating access for a wireless workstation which is connecting to the WLAN hotspot through the soft AP according to the updated access password, the method further comprises: in the case that the wireless workstation passes the authentication, detecting whether data traffic accessed by the wireless workstation is greater than a preset traffic threshold; and if yes, then disconnecting the soft AP from the wireless workstation.

Preferably, after authenticating access for a wireless workstation which is connecting to the WLAN hotspot through the soft AP according to the updated access password, the method further comprises: in the case that the wireless workstation passes the authentication, detecting whether the connection time of the wireless workstation is greater than a preset time threshold; and if yes, then disconnecting the soft AP from the wireless workstation.

According to another aspect of the disclosure, provided is an access authentication device for a WLAN hotspot, comprising: an updating module configured to update an access password of the WLAN hotspot according to a preset update time interval; and an authentication module configured to authenticate access for a wireless workstation which is connecting to the WLAN hotspot through a soft AP according to the updated access password.

Preferably, the updating module comprises: an updating unit configured to update the access password according to the preset update time interval; and a display unit configured to display a prompt that the access password has been updated in the case that the access password has been updated.

Preferably, the device further comprises: a first judgment module configured to, in the case that the wireless workstation passes the authentication, detect whether the data traffic accessed by the wireless workstation is greater than a preset traffic threshold; and a first disconnection module configured to, in the case that the data traffic accessed by the wireless workstation is greater than the preset traffic threshold, disconnect the soft AP from the wireless workstation.

Preferably, the device further comprises: a second judgment module configured to, in the case that the wireless workstation passes the authentication, detect whether connection time of the wireless workstation is greater than a preset time threshold; and a second disconnection module configured to, in the case that the connection time of the wireless workstation is greater than the preset time threshold, disconnect the soft AP from the wireless workstation.

In the disclosure, the following method is used: updating an access password of a WLAN hotspot according to a preset update time interval; and performing access authentication on a wireless workstation connected to the WLAN hotspot through a soft AP according to the updated access password, that is, the access password of the WLAN hotspot is updated automatically in time and the wireless workstation is authenticated according to the updated password. The embodiment of the disclosure solves the problem in the related art that other users may use traffic without limitation once they have stolen the password which causes great damage to users who pay the bill because the access password of the WLAN hotspot may only be manually updated, thus improving the security of the WLAN hotspot, and the connection policy of a user who uses the AP function of a mobile terminal may be controlled, thus improving user availability and user experience.

BRIEF DESCRIPTION OF THE DRAWINGS

Drawings, provided for further understanding of the disclosure and forming a part of the specification, are used to explain the disclosure together with embodiments of the disclosure rather than to limit the disclosure, wherein.

DETAILED DESCRIPTION OF THE INVENTION

The disclosure is described below with reference to the accompanying drawings and embodiments in detail. Note that, the embodiments of the disclosure and the features of the embodiments can be combined with each other if there is no conflict.

Figure 1:
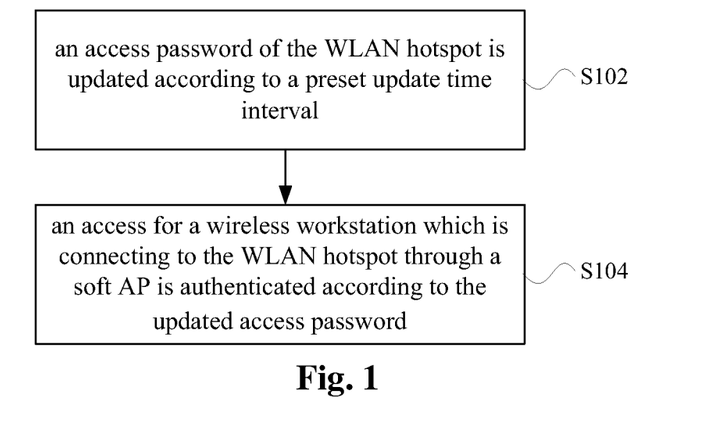
FIG. 1 shows a flowchart of an access authentication method for a WLAN hotspot according to an embodiment of the disclosure.

Based on the problem in the related art that other users can use traffic without limitation once they have stolen the password which causes great damage to users who pay the bill because the access password of the WLAN hotspot can only be manually updated, the disclosure provides an access authentication method for a WLAN hotspot, and as shown in FIG. 1, the method comprises step S102 to step S104:

step S102, an access password of the WLAN hotspot is updated according to a preset update time interval; and step S104, an access for a wireless workstation which is connecting to the WLAN hotspot through a soft AP is authenticated according to the updated access password.

In the embodiments of the disclosure, the following method is used: an access password of a WLAN hotspot is updated according to a preset update time interval; and an access authentication for a wireless workstation which is accessing to the WLAN hotspot through a soft AP is performed according to the updated access password, that is, the access password of the WLAN hotspot is updated automatically in time and the wireless workstation is authenticated according to the updated password. The embodiments of the disclosure solves the problem in the related art that other users may use traffic without limitation once they have stolen the password which causes great damage to users who pay the bill because the access password of the WLAN hotspot can only be manually updated, thus improving the security of the WLAN hotspot, and the connection policy of a user who uses the soft AP function on a mobile terminal may be controlled, thus improving user availability and user experience.

Figure 2:
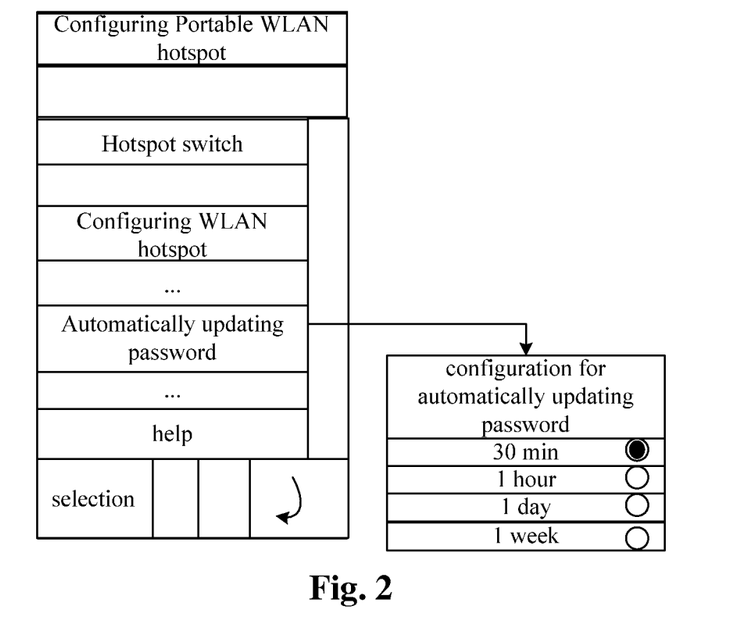
FIG. 2 is a schematic diagram of a setting interface for configuring a WLAN hotspot according to an embodiment of the disclosure.

Before performing step S104, an access password update function of the WLAN hotspot may also be activated and an update time interval may be set. During implementation, when the portable WLAN hotspot is opened, in order to avoid all other devices from accessing this hotspot without control, the access password needs to be set. Other devices which learn this password may connect to this AP to access a data service. During particular implementation, an option box of automatic hotspot connection (access) password update function is set on a portable hotspot setting interface, as shown in FIG. 2. When a user selects to activate this function, the time interval needs to be set, for example, setting 30 min. After the setting is finished, the portable hotspot will modify the access password after 30 min of the current system time; and then, every 30 min, the portable hotspot will automatically update the access password.

The automatic password update function may use various mature random generation algorithms, so as to achieve the purpose of randomly generating a password; and since a local terminal user may view the updated password, random password generation has no influence on the local terminal user. For other users who may not view the setting interface, once the connection is disconnected, the password needs to be input again, and if the password has been updated at this moment, other users may not connect to the WLAN hotspot again, thus protecting the benefit of the local terminal user.

Figure 3:
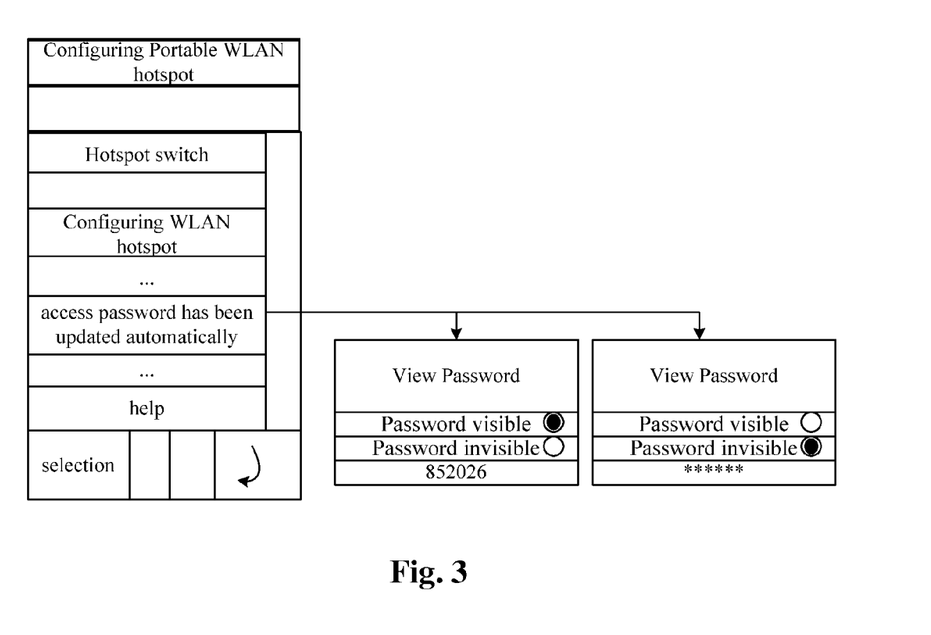
FIG. 3 is a schematic diagram of a prompt for automatically updating access password of a WLAN hotspot according to an embodiment of the disclosure.

In order to prompt to the local terminal user whether the access password has been updated automatically, the WLAN hotspot may update the access password according to a preset update time interval and display a prompt that the access password has been updated. During implementation, a menu option of automatic password update prompt may be added to the portable hotspot setting interface, as shown in FIG. 3. If the password has been updated automatically, this menu option displays that the access password has been updated automatically, and the user may view the updated access password after clicking and entering the menu option, which makes it convenient for the local terminal user to connect to and access a soft AP. If the access password has not been updated automatically, then this menu option displays that the access password has not been updated, and the user still may enter this menu option to view the access password. A clocking function may be realized based on system time, and the time setting and clocking functions are on the basis of the system time of the mobile terminal device.

The soft AP function of the mobile terminal may support a plurality of other wireless workstations to connect to the soft AP simultaneously, and other wireless workstations consume the subscription data traffic of the terminal when accessing an external network via a portable hotspot. Generally, the subscription data traffic of the mobile terminal is limited, and the exceeding part will be charged. However, even if the subscription data traffic of the mobile terminal has been used up, other wireless workstations still may access a data service via a hotspot.

When other wireless workstations access a data service via a soft AP, all the data is first transmitted to the soft AP, then the soft AP forwards the data to the wireless workstations, and therefore, the soft AP may easily statistic data traffic and acquire data for determining whether the condition of triggering hotspot disconnect is satisfied.

Based on the above-mentioned reasons, in the embodiments of the disclosure, after authenticating access for the wireless workstation which is accessing to the WLAN hotspot through the soft AP according to the updated access password, a traffic control mechanism may also be added to the above-mentioned method, which comprises the following processing: if the wireless workstation passes the authentication, it is detected whether the data traffic accessed by the wireless workstation is greater than a preset traffic threshold; and if yes, then the soft AP is disconnected from the wireless workstation.

During setting, the user may limit the data traffic accessed by each wireless workstation, and when it reaches the traffic set for a certain wireless workstation, the soft AP of the mobile terminal automatically disconnect the WLAN connection to this workstation, thus achieving the purpose of managing various wireless workstation connection based on traffic.

Figure 4:
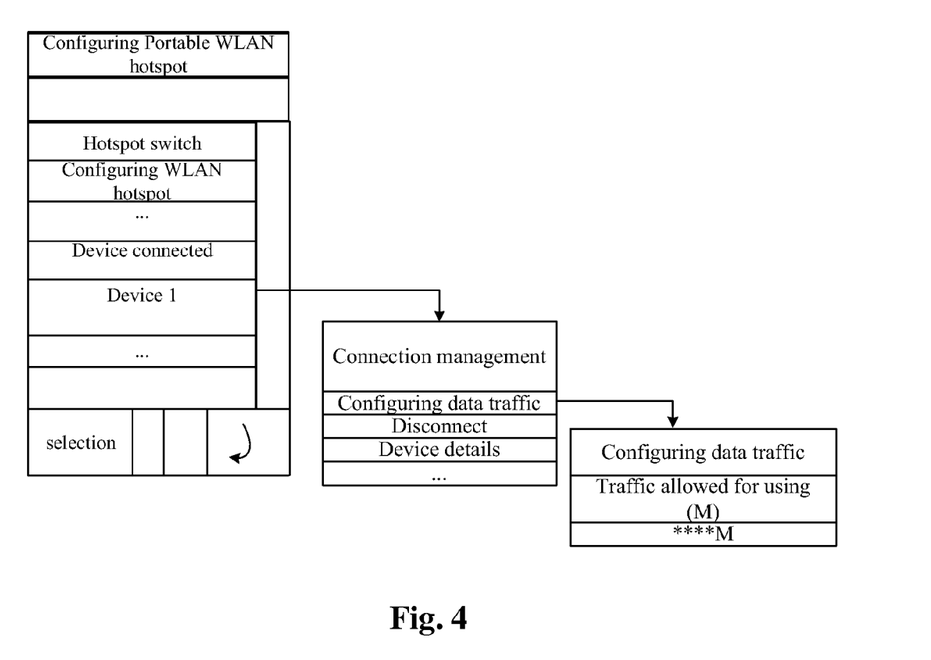
FIG. 4 is a schematic diagram of a configuration interface in which a WLAN hotspot manages a wireless connection based on data traffic according to an embodiment of the disclosure.

During implementation, an option of managing a wireless connection via data traffic on the portable hotspot setting interface, as shown in FIG. 4. When the user sets the data traffic for a certain other connected wireless workstation, for example, setting the data traffic which may be accessed by this wireless workstation to be 30 M. After the setting is finished, when the data traffic accessed by this wireless workstation via a portable WLAN hotspot reaches 30 M, the hotspot will automatically disconnect the connection from this wireless workstation, and prompt information will be popped up to prompt the user that the data traffic accessed by this wireless workstation has reached the set traffic threshold, and the connection to this wireless workstation will be disconnected. At this moment, this wireless workstation may not access a data service via this hotspot.

If this wireless workstation still wants to access this hotspot, then the password may be input again. However, at this moment, this password may be the updated password. If this wireless workstation does not know the updated password, it may not access the WLAN hotspot. The local user may also set the total traffic amount that may be accessed by other workstations. Whatever workstation accesses the hotspot, as long as the total traffic amount reaches the preset threshold, the connection to the hotspot will be disconnected.

The soft AP is taken as a forwarding node of the data traffic, and when other wireless terminals access a data service via this hotspot, the electricity quantity consumption of the hotspot will be significant. Therefore, in the embodiments of the disclosure, a time control mechanism is added, that is, after step S104, it is detected whether the connection time of the wireless workstation is greater than a preset time threshold in the case that the wireless workstation passes the authentication; and if yes, then the connection from the soft AP to the wireless workstation will be disconnected.

During setting, the user may limit the time for each wireless workstation to access the soft AP, and when it reaches the time set for a certain wireless workstation, the soft AP of the mobile terminal automatically disconnect the WLAN connection to this workstation, thus achieving the purpose of managing various wireless workstation connection based on time.

Figure 5:
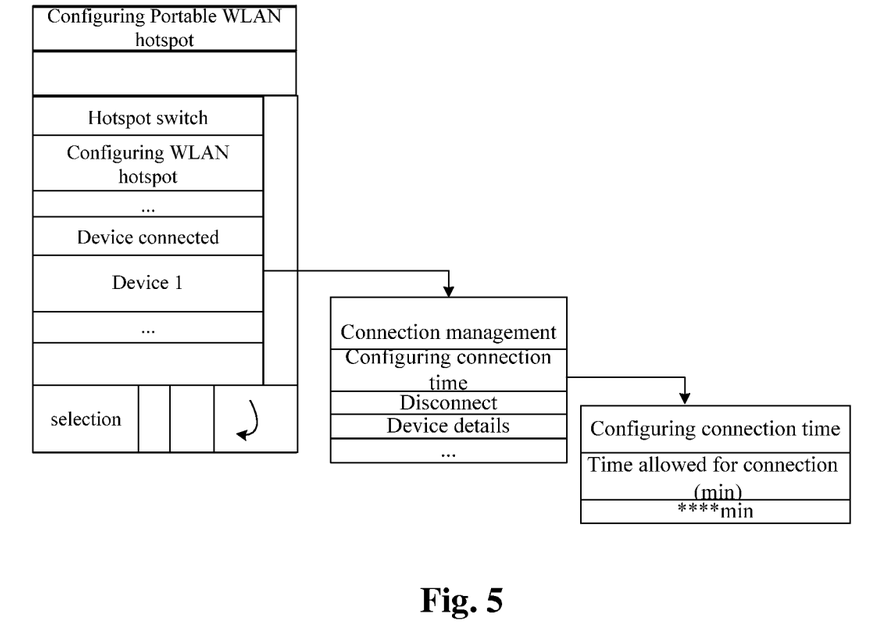
FIG. 5 is a schematic diagram of a configuration interface in which a WLAN hotspot manages a wireless connection based on connection time according to an embodiment of the disclosure.

During implementation, a function option of managing a wireless connection via connection time on the portable hotspot setting interface, as shown in FIG. 5. The local user selects a certain other connected wireless workstation and set the connection time for the selected wireless workstation, for example, setting the time that allows this wireless workstation to connect and access to be 30 min. After the setting is finished, when the time for this wireless workstation to access via the portable WLAN hotspot reaches 30 min, the hotspot will automatically disconnect the connection to this wireless workstation, and prompt information will be popped up to prompt the user that the time for this wireless workstation to connect the soft AP has reached the set threshold, and the connection to this wireless workstation will be disconnected. At this moment, this wireless workstation may not access a data service via this hotspot.

The above-mentioned various methods in this embodiment provide to the user great flexibility to use the WLAN hotspot function and ensure the security and maximum benefit of the local user.

Preferred Embodiment

Figure 6:
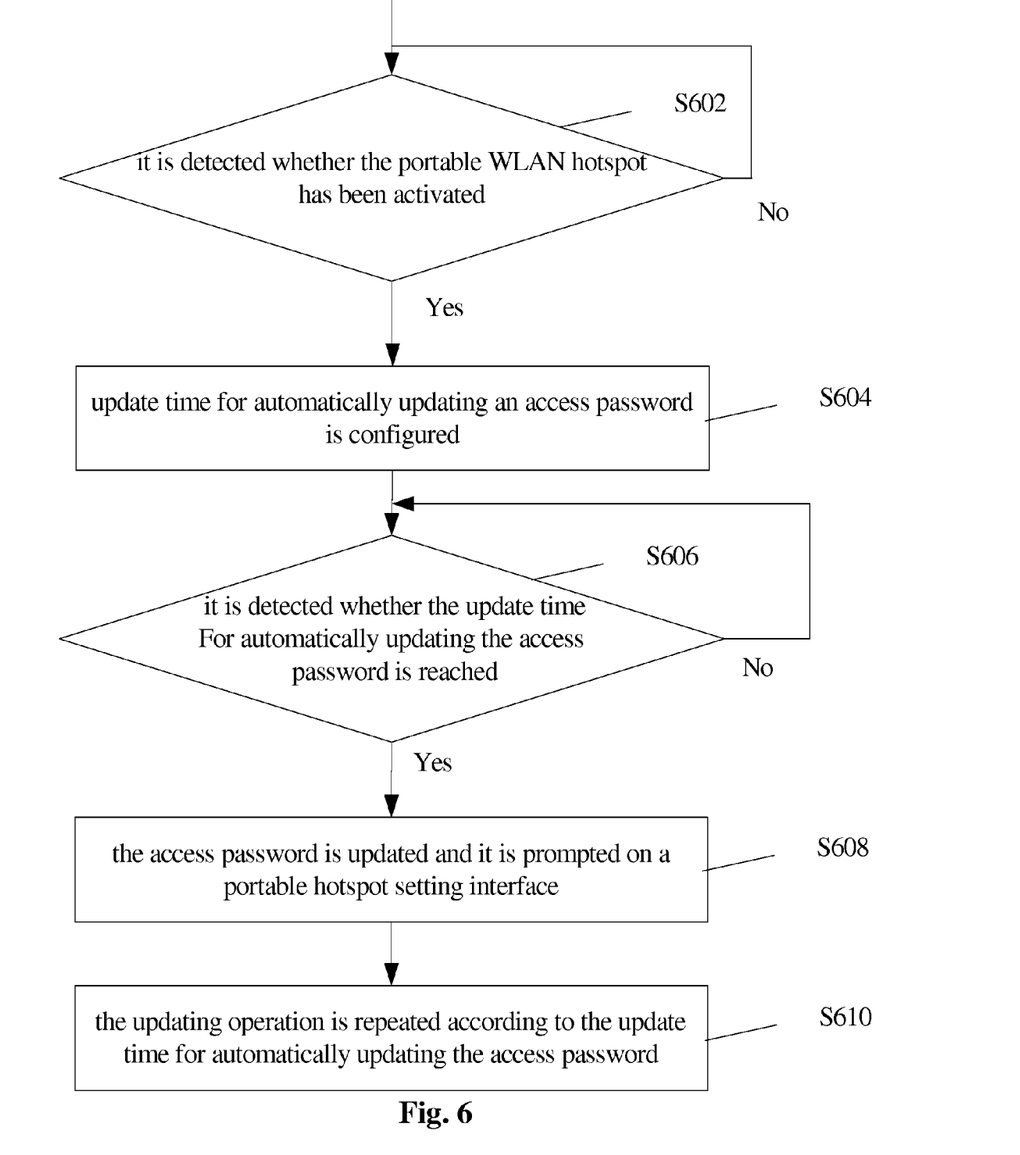
FIG. 6 is a flowchart of an access authentication process according to a preferred embodiment of the disclosure.

As shown in FIG. 6, it is an access authentication process whereby a wireless workstation accesses a soft AP in this preferred embodiment, and this process is performed after activating a portable WLAN hotspot, including step S602 to step S610:

step S602, it is detected whether the portable WLAN hotspot has been activated. If yes, then perform step S604, otherwise, proceed to perform step S602.

Step S604, update time for automatically updating an access password is configured.

Step S606, it is detected whether the update time for automatically updating the access password is reached. If yes, then perform step S608, otherwise, proceed to perform step S606.

Step S608, the access password is updated and it is prompted on a portable hotspot setting interface.

Step S610, the updating operation is repeated according to the update time for automatically updating the access password.

Figure 7:
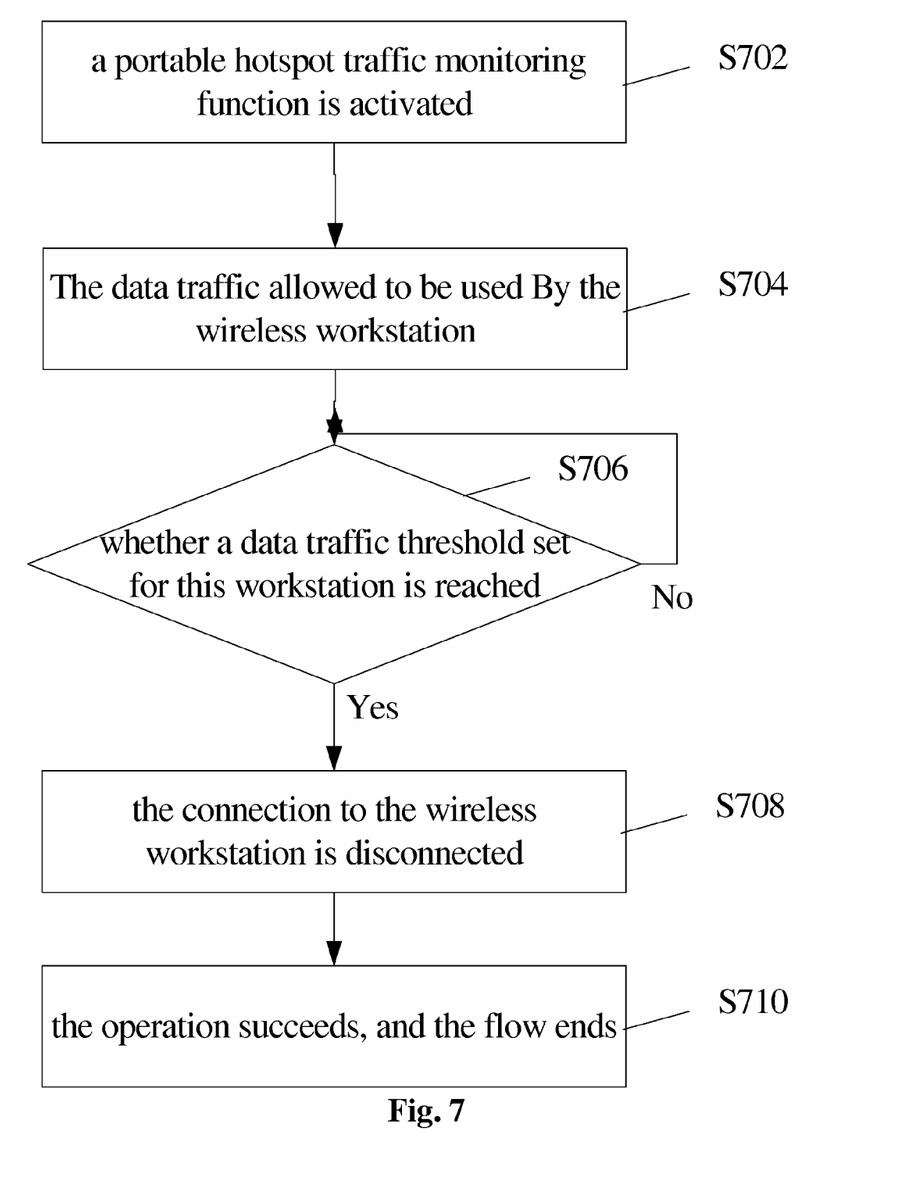
FIG. 7 is a flowchart of managing a wireless connection via data traffic according to a preferred embodiment of the disclosure.

The preferred embodiments of the disclosure will be further described in combination with FIG. 7, and this process includes step S702 to step S710:

step S702, a user selects a certain connected wireless workstation and activates a portable hotspot traffic monitoring function.

Step S704, the user configures the data traffic allowed to be used by this wireless workstation.

Step S706, a terminal detects whether a data traffic threshold set for this workstation is reached. If yes, perform S708, otherwise, proceed to perform step S706.

Step S708, the connection to the wireless workstation is disconnected.

Step S710, the operation succeeds, and the flow ends.

Figure 8:
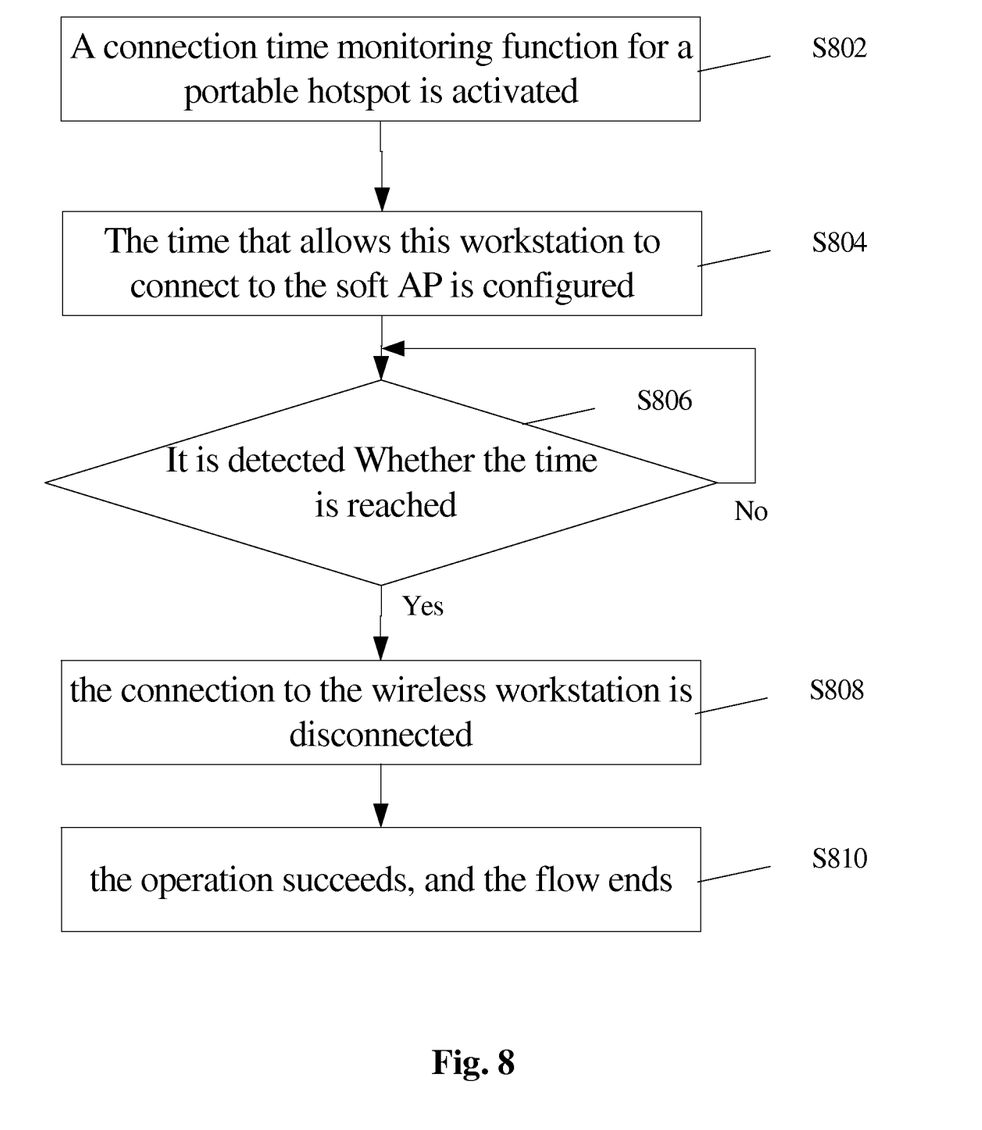
FIG. 8 is a flowchart of managing a wireless connection via connection time according to a preferred embodiment of the disclosure.

The preferred embodiment of the disclosure will be further described in combination with FIG. 8, and this process includes step S802 to step S810:

step S802, a user selects a certain connected wireless workstation and activates a connection time monitoring function for a portable hotspot.

Step S804, the user configures the time that allows this workstation to connect to the soft AP.

Step S806, a terminal detects whether the time is reached, and if yes, perform step S808, otherwise, proceed to perform step S806.

Step S808, the connection to the wireless workstation is disconnected.

Step S810, the operation succeeds, and the flow ends.

The flows shown in FIGS. 7 and 8 may be performed after the authentication flow shown in FIG. 6 has ended, and of course, the flow shown in FIG. 7 or FIG. 8 may be performed individually, and three flows may also be used in combination.

Figure 9:
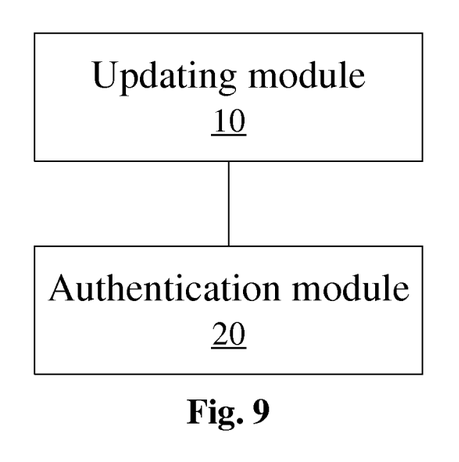
FIG. 9 is structural block diagram 1 of an access authentication device for a WLAN hotspot according to an embodiment of the disclosure.

As shown in FIG. 9, the disclosure also provides an access authentication device for a WLAN hotspot, the device comprising: an updating module 10 configured to update an access password of the WLAN hotspot according to a preset update time interval; and an authentication module 20 coupled to the updating module 10 and configured to authenticate access for a wireless workstation which is connecting to the WLAN hotspot through a soft AP according to the updated access password.

Figure 10:
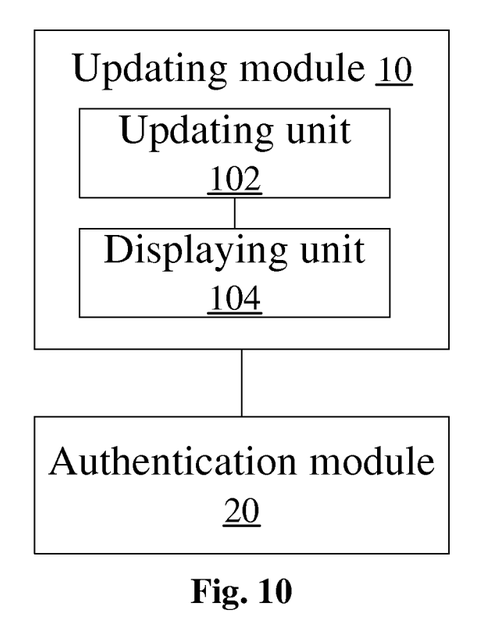
FIG. 10 is structural block diagram 2 of an access authentication device for a WLAN hotspot according to an embodiment of the disclosure.

The updating module 10 may include an updating unit 102 and a display unit 104 shown in FIG. 10, wherein the updating unit 102 may be configured to update the access password according to the preset update time interval; and the display unit 104 is coupled to the updating unit 102 and configured to, in the case that the access password has been updated, display a prompt that the access password has been updated.

Figure 11:
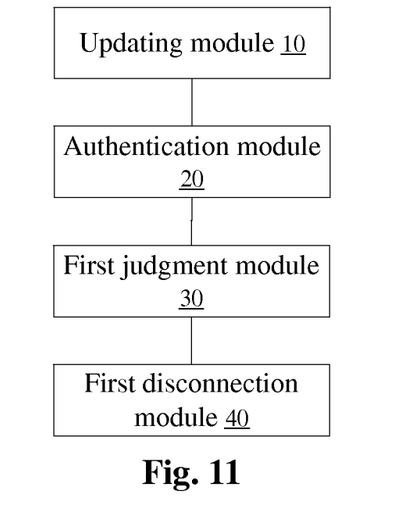
FIG. 11 is structural block diagram 3 of an access authentication device for a WLAN hotspot according to an embodiment of the disclosure.

As shown in FIG. 11, the access authentication device for the WLAN hotspot further comprises: a first judgment module 30 coupled to the authentication module 20 and configured to, in the case that the wireless workstation passes the authentication, detect whether the data traffic accessed by the wireless workstation is greater than a preset traffic threshold; and a first disconnection module 40 coupled to the first judgment module 30 and configured to, in the case that the data traffic accessed by the wireless workstation is greater than the preset traffic threshold, disconnect the soft AP from the wireless workstation.

Figure 12:
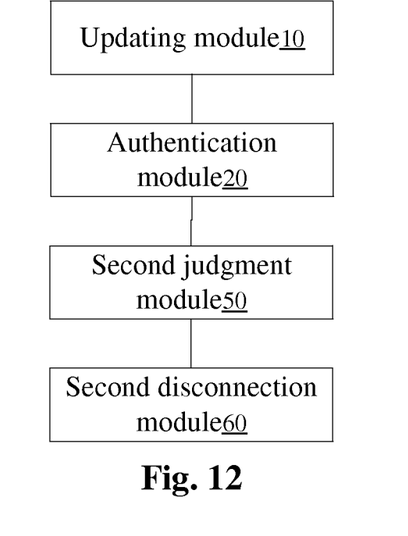
FIG. 12 is structural block diagram 4 of an access authentication device for a WLAN hotspot according to an embodiment of the disclosure.

In order to further optimize the above-mentioned device, the device may further comprise a second judgment module 50 and a second disconnection module 60 shown in FIG. 12, wherein the second judgment module 50 is coupled to the authentication module 20 and configured to, in the case that the wireless workstation passes the authentication, detect whether the connection time of the wireless workstation is greater than a preset time threshold; and the second disconnection module 60 is coupled to the second judgment module 50 and configured to, in the case that the connection time of the wireless workstation is greater than the preset time threshold, disconnect the soft AP from the wireless workstation.

From the description above, it can be seen that the disclosure achieves the following technical effects:

in the embodiments of the disclosure, a function for automatically updating an access password of hotspot is added, so that the WLAN hotspot may automatically update the access password after a certain time interval, avoiding other users connecting to this AP using a certain password, improving the security of the portable WLAN hotspot, and the connection policy of the user who uses the soft AP function of the mobile terminal is controlled, thus improving user availability and in turn improving user experience.

Obviously, those skilled in the art should know that each of the mentioned modules or steps of the disclosure can be realized by universal computing devices; the modules or steps can be focused on single computing device, or distributed on the network formed by multiple computing devices; selectively, they can be realized by the program codes which can be executed by the computing device; thereby, the modules or steps can be stored in the storage device and executed by the computing device; and under some circumstances, the shown or described steps can be executed in different orders, or can be independently manufactured as each integrated circuit module, or multiple modules or steps thereof can be manufactured to be single integrated circuit module, thus to be realized. In this way, the disclosure is not restricted to any particular hardware and software combination.

The descriptions above are only the preferable embodiment of the disclosure, which are not used to restrict the disclosure, for those skilled in the art, the disclosure may have various changes and variations. Any amendments, equivalent substitutions, improvements, etc. within the principle of the disclosure are all included in the scope of the protection of the disclosure.

What is claimed is:

1. An access authentication method for a wireless local area network (WLAN) hotspot, comprising:

activating an access password update function of the WLAN hotspot and setting the update time interval;

the WLAN hotspot updating an access password of the WLAN hotspot according to a preset update time interval and displaying a prompt that the access password has been updated, wherein the updated access password is generated according to a random generation algorithm;

authenticating access for a wireless workstation which is connecting to the WLAN hotspot through a soft AP according to the updated access password;

when the wireless workstation passes the authentication, detecting whether data traffic accessed by the wireless workstation is greater than a preset traffic threshold; and when the data traffic accessed by the wireless workstation is greater than the preset traffic threshold, disconnecting the soft AP from the wireless workstation.

2. The method according to claim 1, wherein after authenticating access for a wireless workstation which is connecting to the WLAN hotspot through the soft AP according to the updated access password, the method further comprises:

if the wireless workstation passes the authentication, detecting whether connection time of the wireless workstation is greater than a preset time threshold; and if the connection time of the wireless workstation is greater than a preset time threshold, disconnecting the soft AP from the wireless workstation.

3. An access authentication device for a wireless local area network (WLAN) hotspot, comprising:

an updating module configured to update an access password of the WLAN hotspot according to a preset update time interval wherein the updated access password is generated according to a random generation algorithm; and an authentication module configured to authenticate access for a wireless workstation which is connecting to the WLAN hotspot through a soft AP according to the updated access password;

wherein the updating module comprises:

an updating unit configured to update the access password according to the preset update time interval; and a display unit configured to display a prompt that the access password has been updated if the access password has been updated;

a first judgment module configured to, when the wireless workstation passes the authentication, detect whether the data traffic accessed by the wireless workstation is greater than a preset traffic threshold; and a first disconnection module configured to, when the data traffic accessed by the wireless workstation is greater than the preset traffic threshold, disconnect the soft AP from the wireless workstation.

4. The device according to claim 3, wherein the device further comprises:

a second judgment module configured to, if the wireless workstation passes the authentication, detect whether connection time of the wireless workstation is greater than a preset time threshold; and a second disconnection module configured to, if the connection time of the wireless workstation is greater than the preset time threshold, disconnect the soft AP from the wireless workstation.

* * * * *